US006332282B1

(12) United States Patent
Lin

(10) Patent No.: US 6,332,282 B1
(45) Date of Patent: Dec. 25, 2001

(54) LAMP SHOWING MOVABLE FLOATING ORNAMENTS

(76) Inventor: Rich Lin, 17F, No. 309, Sec.2, Wen Hua Road, Panchiao, Taipei Hsien (TW)

( * ) Notice: Subject to any disclaimer, the term of this patent is extended or adjusted under 35 U.S.C. 154(b) by 0 days.

(21) Appl. No.: 09/559,590

(22) Filed: Apr. 28, 2000

(51) Int. Cl.$^7$ .............................. G09F 19/00; G09F 19/02
(52) U.S. Cl. .................... 40/406; 40/409; 40/410
(58) Field of Search .............................. 40/406, 409, 410

(56) References Cited

U.S. PATENT DOCUMENTS 5,426,877 * 6/1995 Lin ......................................... 40/406

* cited by examiner

Primary Examiner—Stephen T. Gordon
Assistant Examiner—Hilary Gutman
(74) Attorney, Agent, or Firm—Dougherty & Troxell

(57) ABSTRACT

A lamp showing movable floating ornaments is provided. The lamp mainly includes a lighting means for emitting light, and a closed clear container for containing and showing liquid and floating ornaments therein. A liquid-guiding means and a propeller are provided in a lower part of the container, and a driving means is provided below the container for turning the propeller. When the propeller is driven to turn, liquid flowing into the lower part of the container via the liquid-guiding means is continuously forced back into an upper part of the container via the liquid-guiding means at increased speed, so that the floating ornaments in the liquid in the container are brought to move around and create dynamic scenes in the container.

1 Claim, 7 Drawing Sheets

LAMP SHOWING MOVABLE FLOATING ORNAMENTS

BACKGROUND OF THE INVENTION

The present invention relates to a lamp showing movable floating ornaments. The lamp has a closed clear container, in an upper part of which liquid and floating ornaments are contained and in a lower part of which a liquid-guiding means and a propeller are mounted. A driving means is mounted below the container to rotate the propeller. When the propeller is driven to rotate, liquid flowing from the upper part into the lower part of the container via the liquid-guiding means is forced back into the upper part of the container at an increased speed, so that the floating ornaments in the upper part of the container are caused to move around and create dynamic scenes in the container. Such movable floating ornaments are beautifully shown when the lamp is switched on.

U.S. Pat. No. 5,426,877 entitled "Dynamic Liquid Display Structure" and granted to the inventor of the present invention on Jan. 4, 1994 discloses an ornament 10 generally shown in FIGS. 1 and 2. The ornament 10 looks like a lamp and mainly includes a clear and closed container 11, driving means 12 and lighting means 13. The driving means 13 is, for example, an electromagnetic driving mechanism for rotating a propeller 111 inside the closed container 11, so that the propeller 111 drives clear liquid in the closed container 11 to rush upward and thereby carries a plurality of balls 112 in the closed container 11 to move upward along an upright hollow tube 113. When the balls 112 reach a top opening of the tube 113, they are carried by the liquid to move out of the tube 113 and slowly and freely fall in the liquid. Light emitted by the lighting means 13 illuminates the container 11 and the balls 112 moving upward and downward in the container 11, enabling the ornament 10 to be a good lamp having ornamental effect.

It is tried by the inventor to make further improvements on the disclosure of U.S. Pat. No. 5,426,877, so that a superior lamp showing movable floating ornaments is provided.

SUMMARY OF THE INVENTION

A primary object of the present invention is, therefore, to provide a lamp showing movable floating ornaments. The lamp includes a lighting means for emitting light, and a closed clear container for containing and showing liquid and floating ornaments therein. A liquid-guiding means and a propeller are provided in a lower part of the container, and a driving means is provided below the container for turning the propeller. When the propeller is driven to turn, liquid flowing into the lower part of the container via the liquid-guiding means is continuously forced back into an upper part of the container via the liquid-guiding means at increased speed, so that floating ornaments in the liquid in the container are brought to move around and create dynamic scenes in the container.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
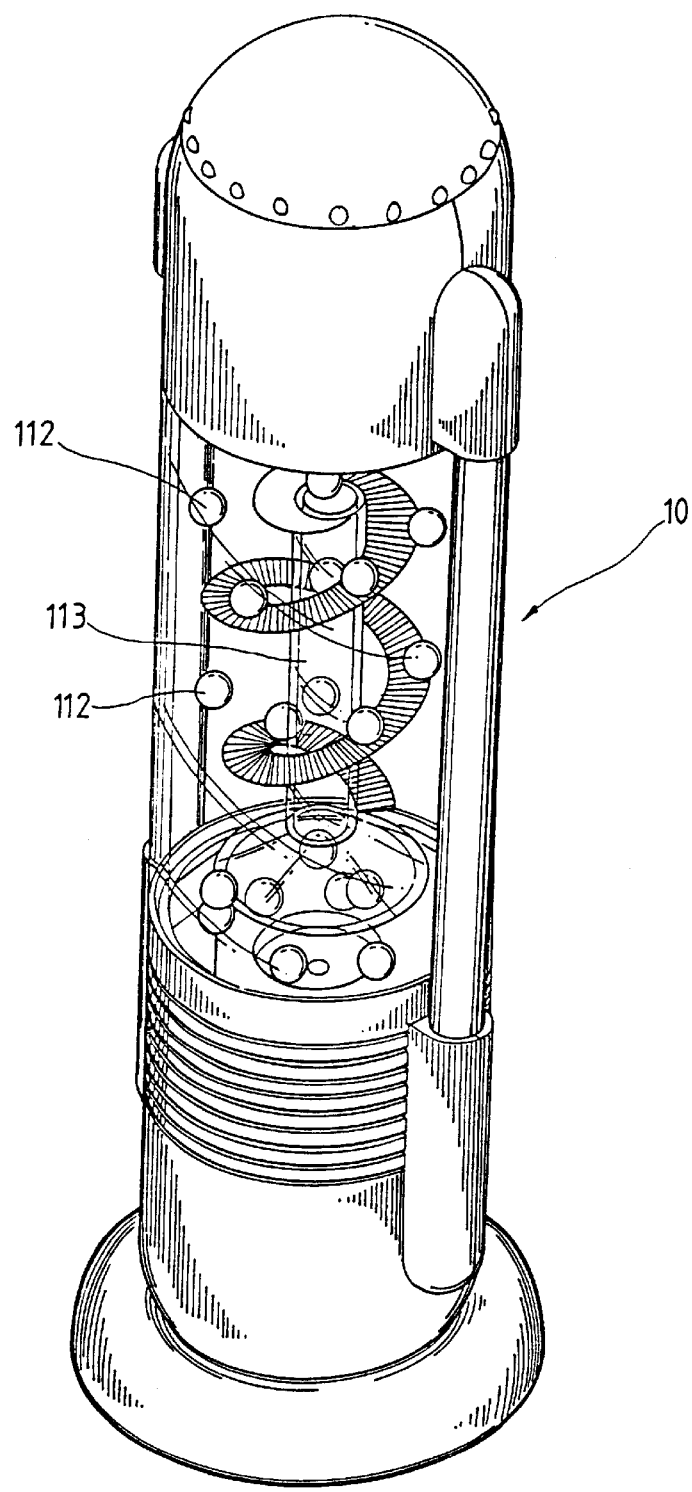
FIG. 1 is a perspective of a conventional dynamic liquid display structure.
Figure 2:
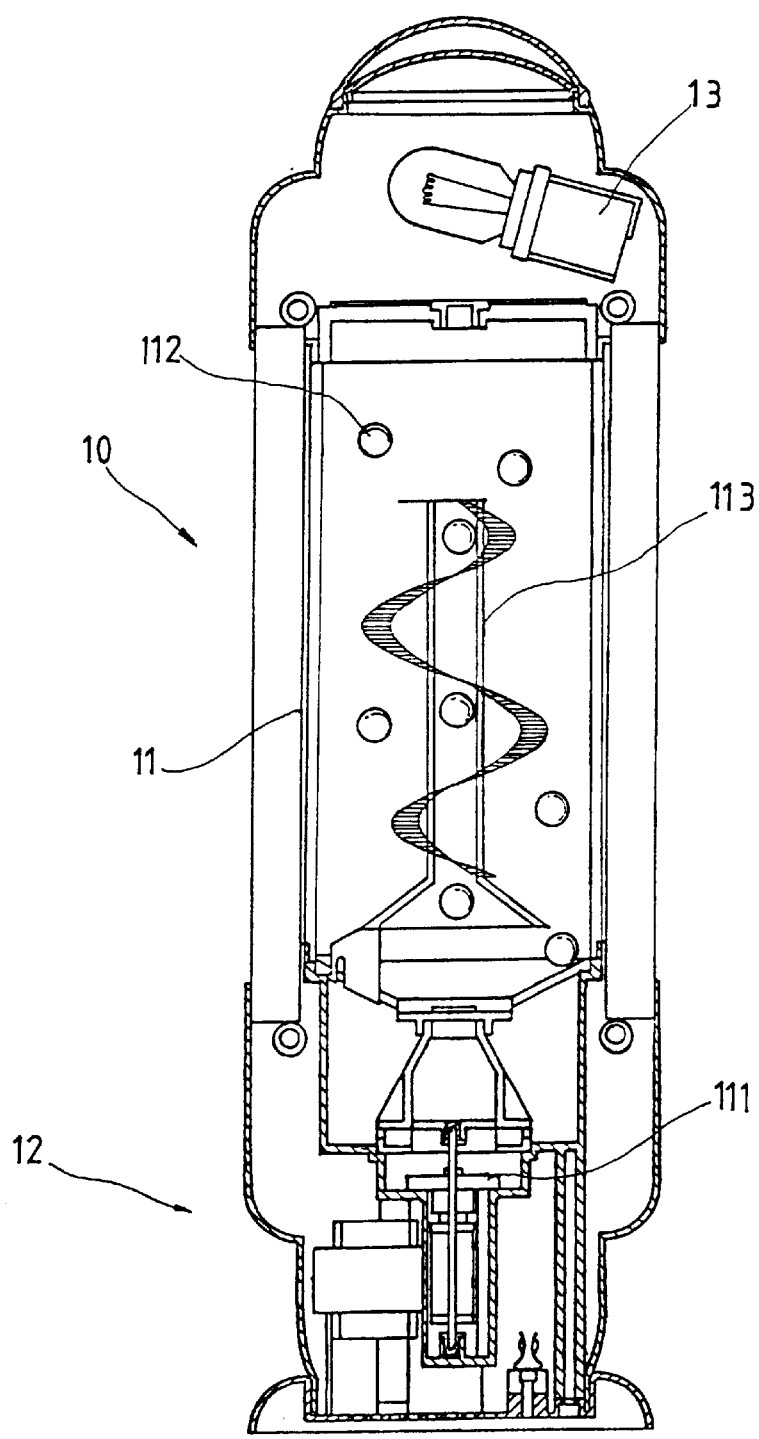
FIG. 2 is a sectional view of the dynamic liquid display structure of FIG. 1.

Please refer to FIGS. 3 to 6. A lamp showing movable floating ornaments according to the present invention mainly includes a closed container 20, a liquid-guiding means 30, a driving means 40, and a lighting means 50.

The driving means 40 and the lighting means 50 are generally similar to that employed in U.S. Pat. No. 5,426,877 entitled "Dynamic Liquid Display Structure" granted to the inventor of the present invention. The driving means 40 is located outside and below a lower part of the closed container 20 and mainly includes an electromagnetic coil 41 and other related electronic circuits (not shown). When the electromagnetic coil 41 is supplied with an electric current, a shaft 42 mounted in the lower part of the closed container 20 is electromagnetically induced to rotate, causing a propeller 43 connected to the shaft 42 to rotate at the same time.

The lighting means 50 is located outside and above an upper part of the closed container 20. Light emitted by the lighting means 50 is projected to and reflected from a reflecting mirror 51 to pass through a clear top surface of the closed container 20 and down into the container 20.

The closed container 20 is provided near a middle area of the upper part with at least a transparent portion 21 through which an interior of the closed container 20 can be seen from outside of the container 20.

The lower part of the closed container 20 forms a stepped base 22 of the container 20. The stepped base 22 is further divided into an upper chamber 221, a middle chamber 222, and a lower chamber 223 (see FIG. 6), diameters of which sequentially reduce from the upper to the lower chambers. The shaft 42 is received in the lower chamber 223 with the propeller 43 located in the middle chamber 222, and the liquid-guiding means 30 is mounted in the upper chamber 221.

Figure 6:
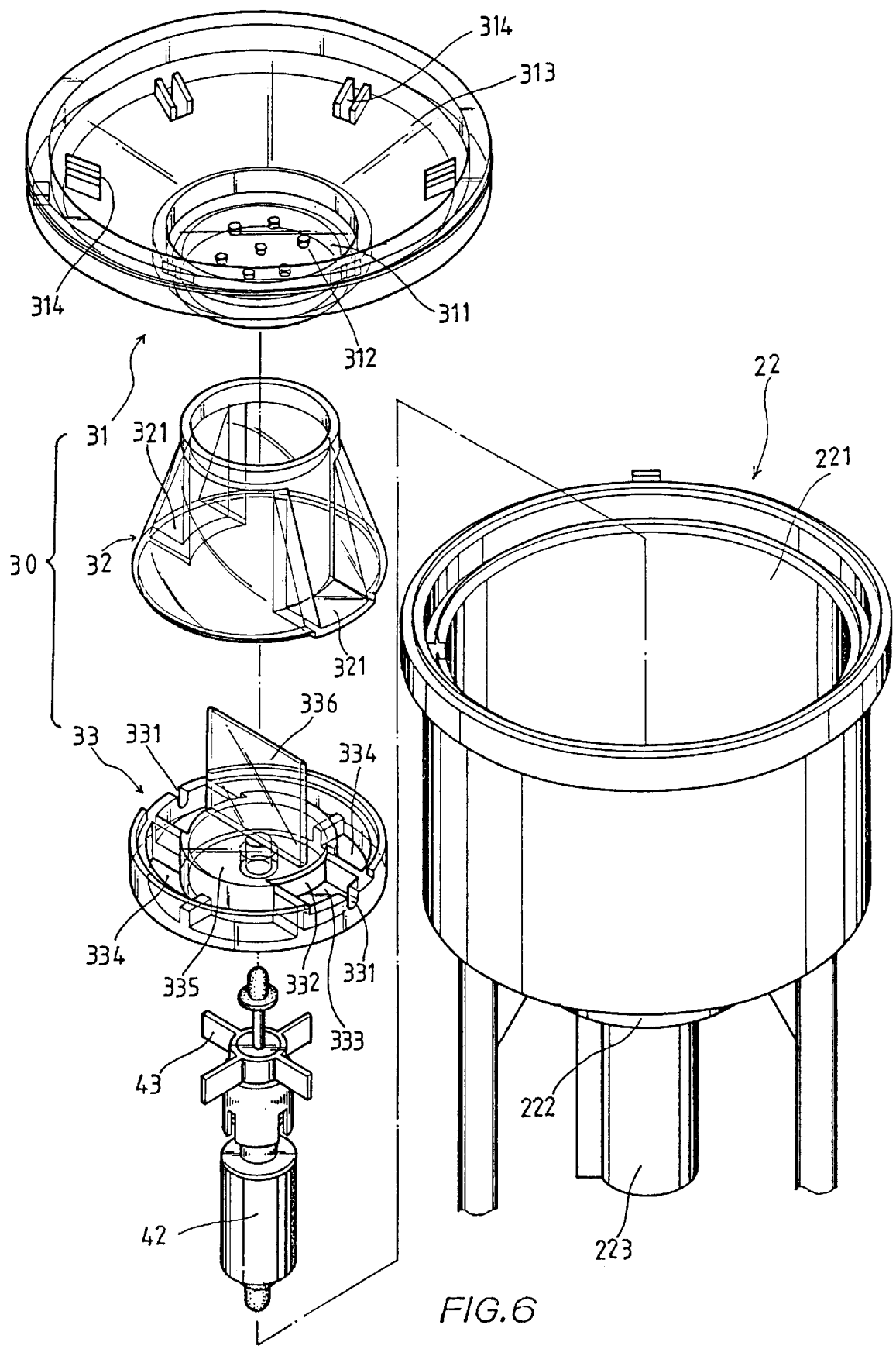
FIG. 6 is an exploded perspective of a liquid-guiding means provided at a lower part of the closed container of FIG. 5.

Please refer to FIG. 6 that is an exploded perspective of the liquid-guiding means 30. As shown, the liquid-guiding means 30 mainly includes an upper hollow cone 31, a middle hollow cone 32, and a lower disc 33. The lower disc 33 is connected along its bottom outer periphery to a top inner periphery of the middle chamber 222 to locate above the propeller 43. The lower disc 33 is formed at its vertical peripheral wall with two diametrically opposite and transversely extended through holes 331, and above its bottom with two diametrically opposite and open-topped compartments 333. A radially outer side of each compartment 333 communicates with one of the two through holes 331 and a radially inner side of each compartment 333 is a vertical opening 332. Portions on the bottom of the lower disc 33 at two sides of the compartments 333 are provided with two sector-shaped openings 334. The lower disc 33 has a raised central portion to provide a central horizontal partition 335 on the disc 33. A plate 336 is uprightly fixed on a top of the central horizontal partition 335, so that liquid passing the lower disc 33 is divided by the plate 336 into two separated flows.

The middle hollow cone 32 is connected to the top of the lower disc 33 and has a reduced open top and an expanded open bottom. Two horizontal walls 321 radially inward extend from a lower outer periphery of the middle hollow cone 32 and are at positions immediately above the two compartments 333 on the lower disc 33.

The upper hollow cone 31 is a shallow cone having an expanded open top and a reduced closed bottom 311. The upper hollow cone 31 is so dimensioned that an upper outer periphery thereof is fitly connected to an upper inner periphery of the upper chamber 221 and a lower inner periphery of the upper hollow cone 31 is fitly connected to an upper outer periphery of the middle hollow cone 32. The bottom 311 of the upper hollow cone 31 is provided with a plurality of vertically extended spray holes 312, and an inclined peripheral wall 313 of the cone 31 between the open top and the closed bottom 311 thereof is provided with a plurality of vertically extended through holes to serve as liquid inlets 314.

Figure 7:
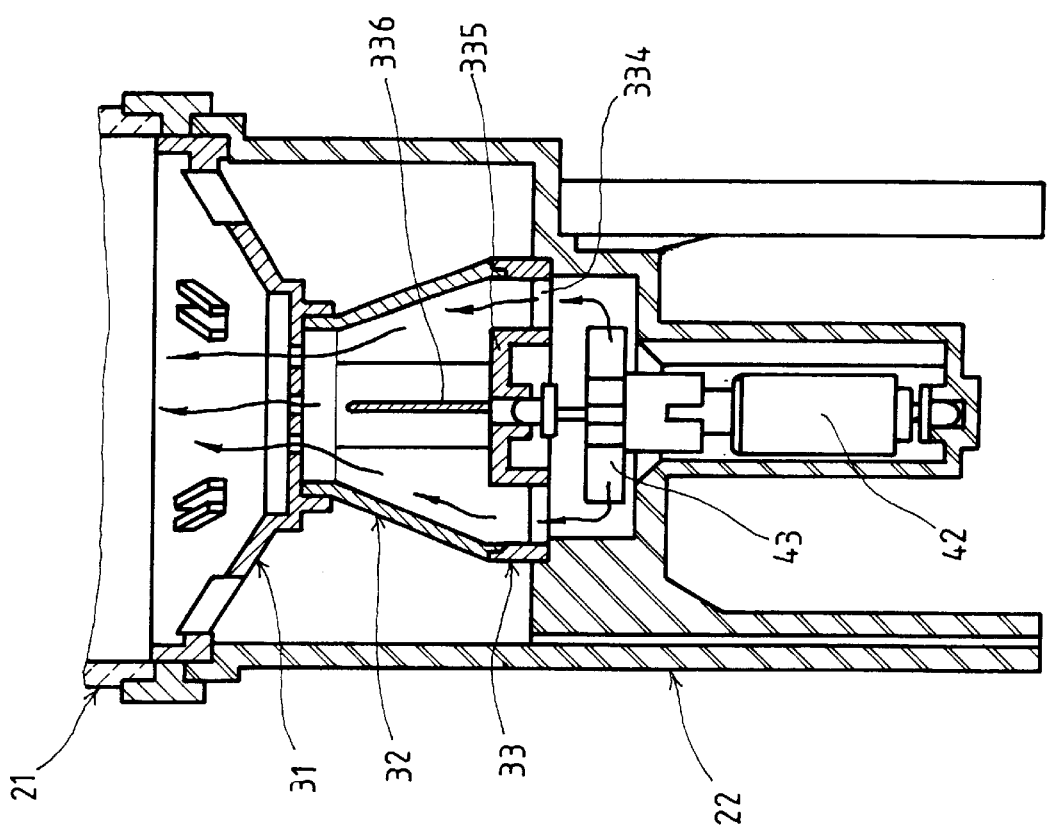
FIG. 7 shows paths along which liquid in the closed container of FIG. 5 flowing from an upper part to a lower part thereof.

Please now refer to FIG. 7 in which thick arrows are used to indicate paths of liquid flowing from the upper part of the closed container 20 into the middle chamber 222 of the lower part of the closed container 20. As can be clearly seen from FIG. 7, liquid in the closed container 20 passes through the liquid inlets 314 provided on the inclined peripheral wall 313 of the upper hollow cone 31 of the liquid-guiding means 30 and enters into the upper chamber 221. Being stopped by the bottoms of the compartments 333 and the horizontal walls 321 of the middle hollow cone 32, liquid in the upper chamber 221 could only pass the through holes 331 on the vertical wall of the lower disc 33 and flow down into the middle chamber 222 via the vertical openings 332.

Figure 8:
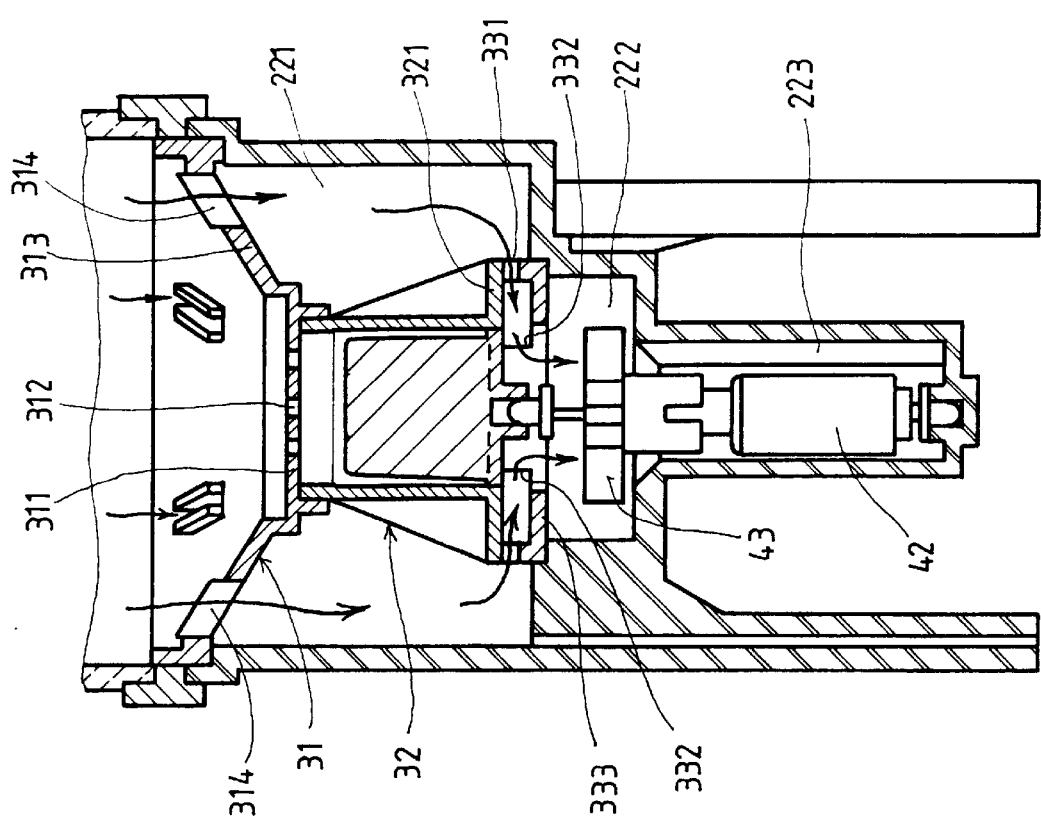
FIG. 8 shows paths along which liquid in the closed container of FIG. 5 flowing from the lower part to the upper part thereof.

When the driving means 40 is actuated to induce the shaft 42 and accordingly turn the propeller 43, liquid in the middle chamber 222 of the lower part of the closed container 20 is initially sucked downward and then forced outward by the propeller 43. Being stopped by a peripheral wall of the middle chamber 222 as well as the bottoms of the compartments 333 and the central horizontal partition 335 of the lower disc 33, the liquid forced outward by the propeller 43 could only move upward to pass through the sector-shaped openings 334 on the lower disc 33 to enter into the middle hollow cone 32. When the liquid in the middle hollow cone 32 flows to the bottom 311 of the upper hollow cone 31 connected to a top of the middle cone 32, it sprays upward into the upper part of the closed container 20 via the spray holes 312 on the bottom 311 of the upper cone 31 at an increased speed, bringing floating ornaments 60 disposed in the upper part of the closed container 20 to move around and create dynamic scenes in the container 20. Thick arrows in FIG. 8 indicate paths of liquid flowing from the middle chamber 22 back into the upper part of the closed container 20.

Figure 3:
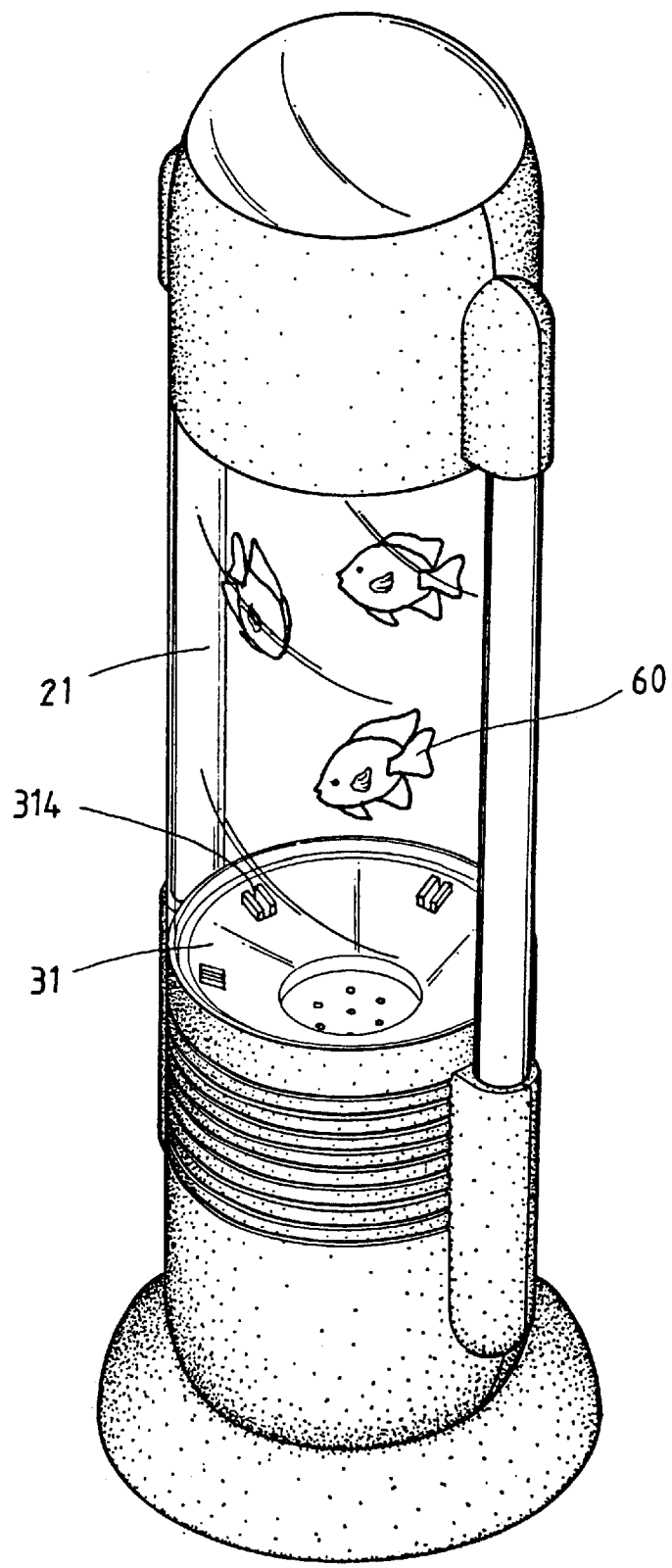
FIG. 3 is a perspective of a lamp showing movable floating ornaments according to the present invention.
Figure 4:
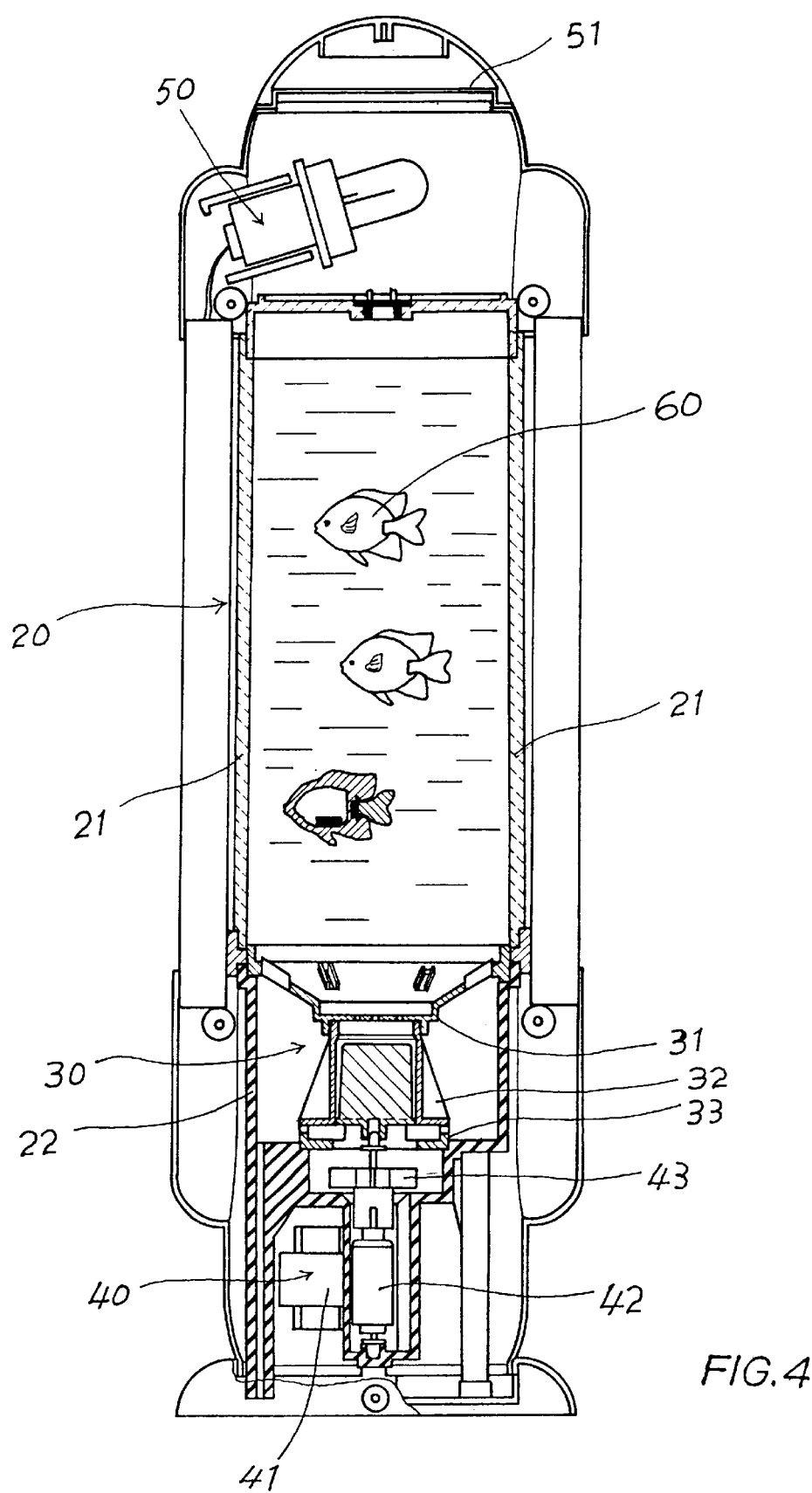
FIG. 4 is a sectional view of the lamp of FIG. 3.
Figure 5:
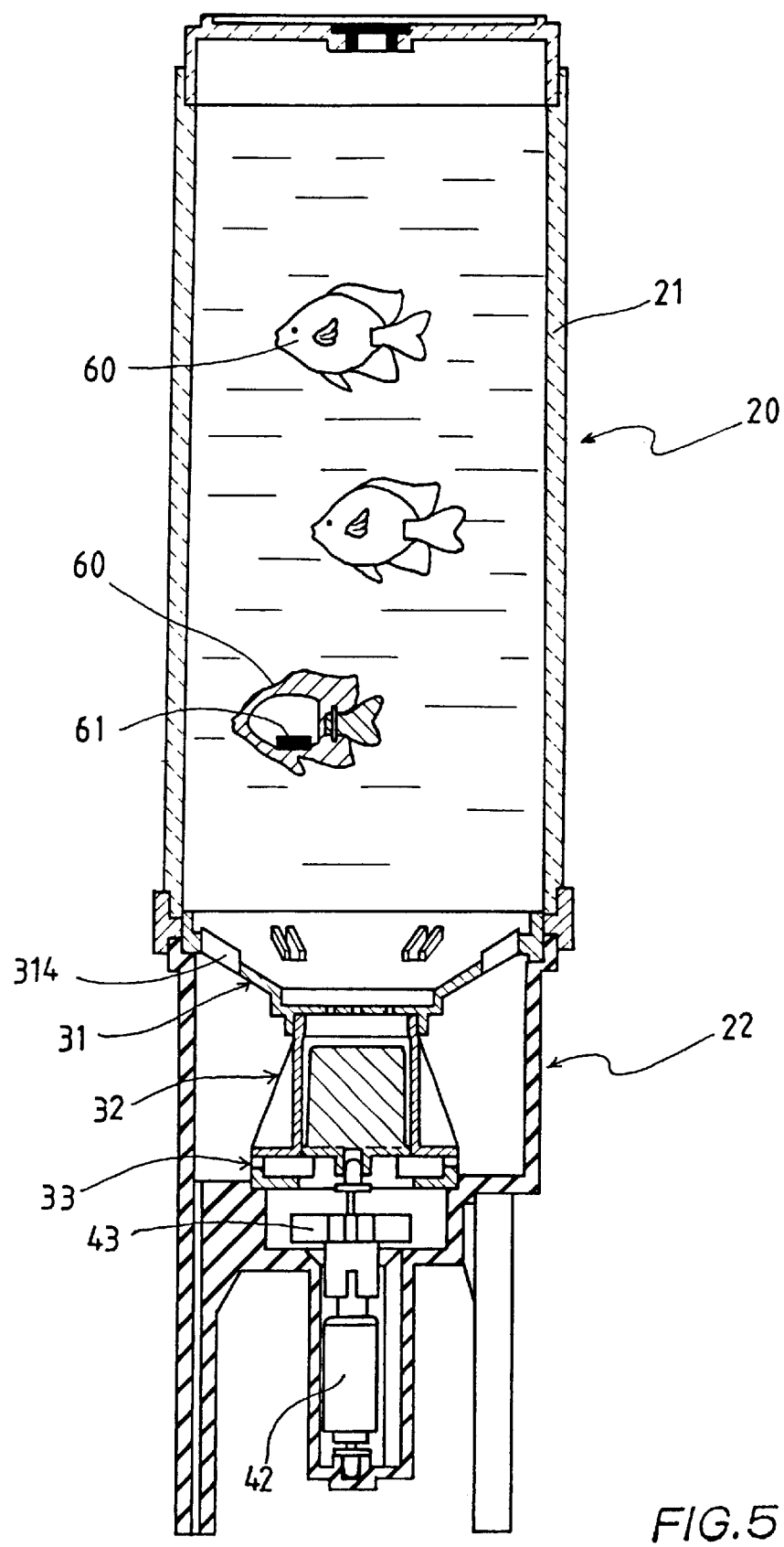
FIG. 5 is a sectional view of a closed liquid container associated with the lamp of the present invention for containing liquid and floating ornaments therein.

The floating ornaments 60 may be of any shapes. In FIG. 3, three-dimensional fish-shaped ornaments are provided in the container 20. For the floating ornaments 60 to always maintain an upright and floating position in the liquid in the container 20, a weight 61 is mounted in each of the floating ornaments 60 at a bottom thereof.

And, for the lamp of the present invention to be visually more attractive, one lateral half of the transparent portion 21 of the upper part of the container 20 may be provided with meaningful background for the movable floating ornaments 60, such as a submarine scene for fish-shaped ornaments, by directly imprinting the scene on the transparent portion 21 or attaching a picture of such scene to the transparent portion 21 at a proper position thereof.

What is claimed is:

1. A lamp showing movable floating ornaments, comprising a closed container, a liquid-guiding means, a driving means, and a lighting means;

said driving means being located outside and below a lower part of said closed container, such that when an electromagnetic coil of said driving means is supplied with an electric current, a shaft mounted in said lower part of said closed container is electromagnetically induced to rotate, causing a propeller connected to said shaft to rotate at the same time;

said lighting means being located outside and above an upper part of said closed container, such that light emitted by said lighting means is reflected from a reflecting mirror mounted above said lighting means to pass through a clear top surface of said closed container and down into said closed container;

said closed container being provided near a middle area of said upper part with at least a transparent portion through which an interior of said closed container can be seen from outside of said closed container;

said lower part of said closed container forming a stepped base of said closed container, said stepped base being further divided into an upper chamber, a middle chamber, and a lower chamber, diameters of said chambers sequentially reduce from said upper to said lower chambers; said shaft being received in said lower chamber with said propeller located in said middle chamber, and said liquid-guiding means being mounted in said upper chamber;

said liquid-guiding means including an upper hollow cone, a middle hollow cone, and a lower disc; said lower disc being connected along a bottom outer periphery therof to a top inner periphery of said middle chamber in order to locate said lower disc above said propeller, said lower disc being formed at a vertical peripheral wall thereof with two diametrically opposite and transversely extended through holes, and above a bottom with two diametrically opposite and open-topped compartments, a radially outer side of each said compartment communicating with one of said two through holes and a radially inner side of each said compartment defining a vertical opening, portions on said bottom of said lower disc at two sides of said compartments being provided with two sector-shaped openings, said lower disc having a raised central portion to provide a central horizontal partition on said lower disc, a plate being uprightly fixed on a top of said central horizontal partition, so that when liquid passes through said lower disc said liquid is divided by said plate into two separated flows;

said middle hollow cone being connected to a top of said lower disc and having a reduced open top, an expanded open bottom, and two horizontal walls radially inward extending from a lower outer periphery of said middle hollow cone and locating at positions immediately above said two compartments on said lower disc; and said upper hollow cone being a shallow cone having an expanded open top and a reduced closed bottom, said upper hollow cone being so dimensioned that an upper outer periphery thereof is fitly connected to an upper inner periphery of said upper chamber and a lower inner periphery of the upper hollow cone is fitly connected to an upper outer periphery of said middle hollow cone; said bottom of said upper hollow cone being provided with a plurality of vertically extended spray holes, and an inclined peripheral wall of the upper hollow cone between said open top and said closed bottom thereof being provided with a plurality of vertically extended through holes to serve as liquid inlets;

whereby when said liquid in said closed container passes through said liquid inlets provided on said inclined peripheral wall of said upper hollow cone of said liquid-guiding means and enters into said upper chamber, said liquid is stopped by bottoms of said compartments on said lower disc and said horizontal walls of said middle hollow cone and could only pass said through holes on said vertical wall of said lower disc and flow down into said middle chamber via said vertical openings at said radially inner sides of said compartments of said lower disc; and when said driving means is actuated to induce said shaft and accordingly turn said propeller, said liquid in said closed container is initially sucked downward and then forced outward by said propeller; said liquid being forced outward by said propeller is stopped by a peripheral wall of said middle chamber as well as by said bottoms of said compartments and said central horizontal partition of said lower disc and could only move upward to pass through said sector-shaped openings on said lower disc to enter into said middle hollow cone; and when said liquid in said middle hollow cone flows to said bottom of said upper hollow cone connected to said top of said middle hollow cone, said liquid sprays upward into said upper part of said closed container via said spray holes on said bottom of said upper hollow cone at an increased speed, bringing said floating ornaments disposed in said upper part of said closed container to move around and create dynamic scenes in said closed container.

* * * * *